US012630248B2

(12) United States Patent
　　Waddell

(10) Patent No.:　US 12,630,248 B2
(45) Date of Patent:　May 19, 2026

(54) ABOVE AXLE, UNIVERSAL BOLT ON REAR RACK TYPE BATTERY AND ACCESSORY MOUNTING BASE/BASKET RISER FOR E-TRIKE CONVERSION

(71) Applicant: Mark Waddell, Schaumburg, IL (US)

(72) Inventor: Mark Waddell, Schaumburg, IL (US)

( * ) Notice: Subject to any disclaimer, the term of this patent is extended or adjusted under 35 U.S.C. 154(b) by 445 days.

(21) Appl. No.: 18/320,987

(22) Filed: May 21, 2023

(65) Prior Publication Data

US 2023/0399070 A1　　Dec. 14, 2023

Related U.S. Application Data

(60) Provisional application No. 63/366,248, filed on Jun. 12, 2022.

(51) Int. Cl.
　　*B62J 43/20*　　(2020.01)
　　*B62J 9/23*　　(2020.01)
　　*B62K 5/027*　　(2013.01)

(52) U.S. Cl.
　　CPC .................. *B62J 43/20* (2020.02); *B62J 9/23* (2020.02); *B62K 5/027* (2013.01)

(58) Field of Classification Search
　　CPC ... B62J 43/20; B62J 9/23; B62J 43/13; B62K 5/027; B62K 5/02; B62M 6/90
　　See application file for complete search history.

(56) References Cited

U.S. PATENT DOCUMENTS

| | | | | |
|---|---|---|---|---|
| 3,592,487 | A | * | 7/1971 | Mansperger ............. B62J 15/02 280/282 |
| 3,598,195 | A | * | 8/1971 | Steller ...................... B62K 5/02 180/65.265 |
| 4,865,337 | A | * | 9/1989 | Disler ...................... B62K 9/02 403/368 |
| 5,353,973 | A | * | 10/1994 | McMurtrey ................ B62J 9/21 224/434 |
| 6,293,449 | B1 | * | 9/2001 | McGuire .................. B62J 11/00 224/451 |
| D496,321 | S | * | 9/2004 | McMurtrey .................. D12/115 |
| 8,322,583 | B2 | * | 12/2012 | Crum, Jr. ................... B62J 9/27 224/430 |
| D706,203 | S | * | 6/2014 | Gibson ........................ D12/406 |
| D722,003 | S | * | 2/2015 | Gibson ........................ D12/223 |
| 10,279,856 | B2 | * | 5/2019 | Marin ........................ B62J 9/21 |

* cited by examiner

*Primary Examiner* — Valentin Neacsu
*Assistant Examiner* — Marlon A Arce
(74) *Attorney, Agent, or Firm* — Underwood + Associates, LLC

(57)　　　　ABSTRACT

A fabricated carbon steel battery mounting bracket to bolt up to 3 rear rack style e-bike batteries on an adult tricycle. It bolts to the rear axle cage through the existing basket bolt holes and has 2 end supports that rest on and clamp around the axle outer tube. The basket is bolted to the top of the bracket through the holes above the battery positions.

11 Claims, 9 Drawing Sheets

ABOVE AXLE, UNIVERSAL BOLT ON REAR RACK TYPE BATTERY AND ACCESSORY MOUNTING BASE/BASKET RISER FOR E-TRIKE CONVERSION

CROSS-REFERENCE TO RELATED APPLICATIONS

This submission claims benefit of provisional utility patent application No. 63/366,248. Filing date 06/12/2022. First inventor: Mark Waddell. Title of invention: Above axle universal clamp affixed, rear rack type battery mounting base/basket riser for e-trike conversion

BACKGROUND OF THE INVENTION

Manual pedal power adult tricycles are good candidates to convert to electric tricycles. Currently, converting a standard pedal tricycle to electric with a front hub or mid drive motor requires selecting a battery enclosure type and determining where to locate it on the tricycle frame. This requires drilling mounting holes to permanently affix the battery to the frame. Often the battery is placed in the rear basket and fastened in some fashion, or not at all. I have designed a battery mounting bracket to allow the use of the "rear rack" type battery on manual pedal power adult tricycles.

SUMMARY OF THE INVENTION

The invention of the "Above axle, universal bolt on rear rack type battery and accessory mounting base/basket riser for e-trike conversion" solves the problem of battery enclosure type selection and mounting on adult pedal tricycles. This invention bolts to the tricycle axle cage through the existing basket mounting holes, provides the mounting holes for up to 3 rear rack style batteries side by side, as well as a new set of mounting holes to bolt the basket on top. Electric trikes need only 1 battery to operate. This allows for flexibility in the use of the 3 battery positions for accessories such as a tool box or a motor controller enclosure box in any of the 3 positions based on specific user requirements. This invention will simplify the conversion of pedal trikes to e-trikes by eliminating battery selection and frame drilling to mount the battery.

DETAILED DESCRIPTION

This disclosure details an invention to join an adult tricycle rear axle cage, rear rack type battery(s) or accessories and a rear basket together. The axle cages on adult tricycles that are common to the retail marketplace have similar design characteristics typically using two ⅞" diameter tubes for the basket mounting surface and a 1½" diameter axle tube. One common style of rear rack battery found in the industry utilizes an aluminum plate bolted to a mounting surface that the battery slides on and locks to. These batteries are typically used on 2 wheel bicycles and, as the description indicates, are commonly mounted to bicycles in the rear rack over the back tire. This invention provides a mounting surface for use of this type of rear rack style battery on adult tricycles.

Figure 1:
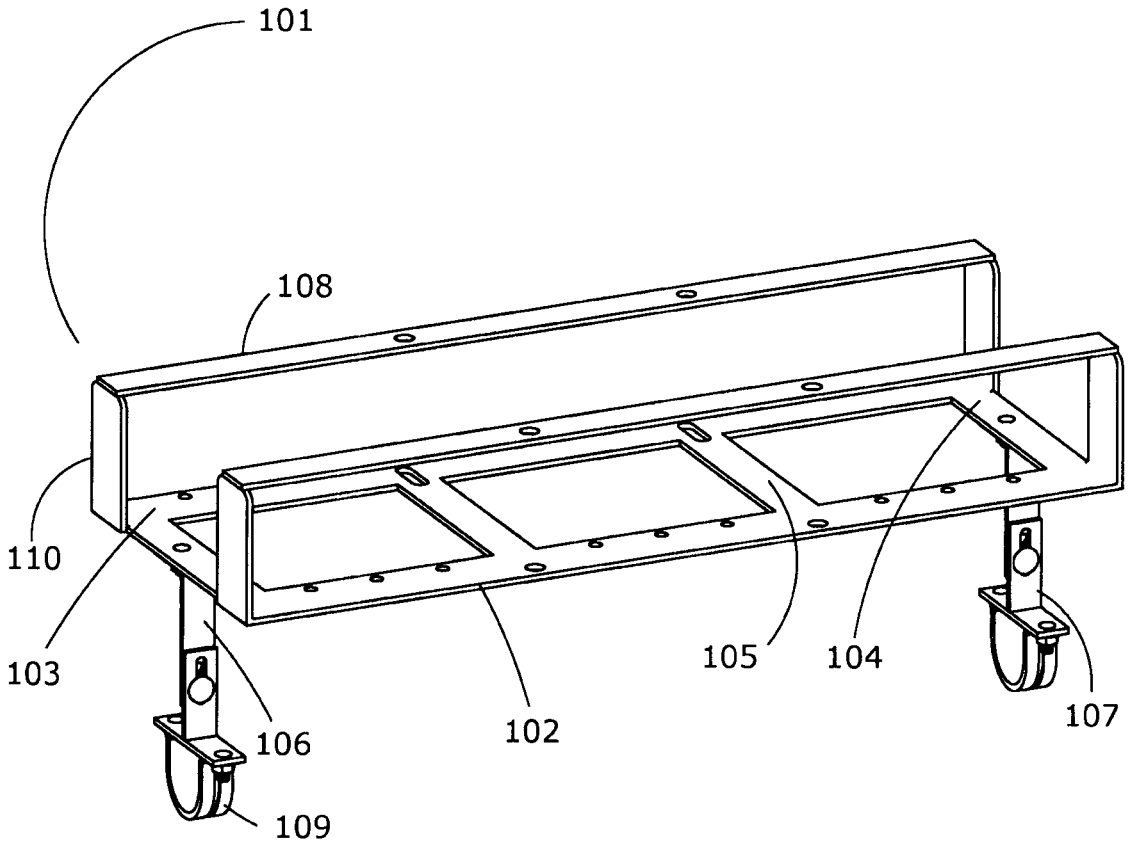
FIG. 1 is the front/top/left perspective view of the above axle, universal bolt on rear rack type battery and accessory mounting base/basket riser for e-trike conversion.
Figure 2:
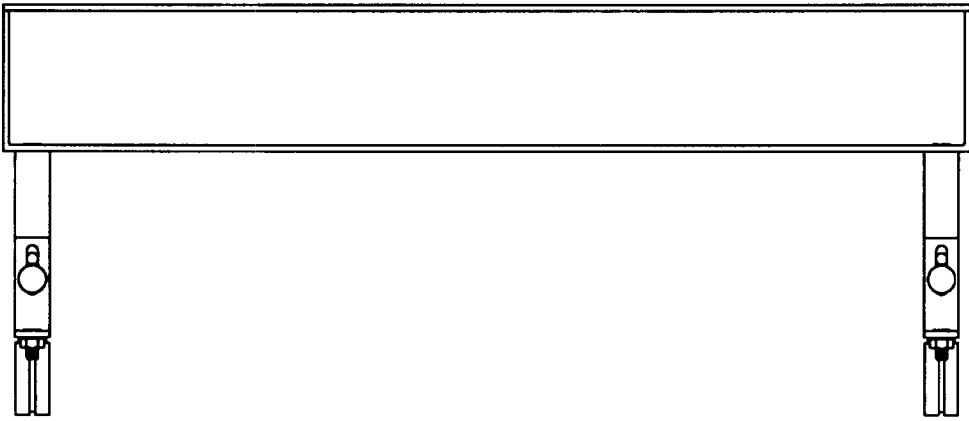
FIG. 2 is the front view of FIG. 1.
Figure 3:
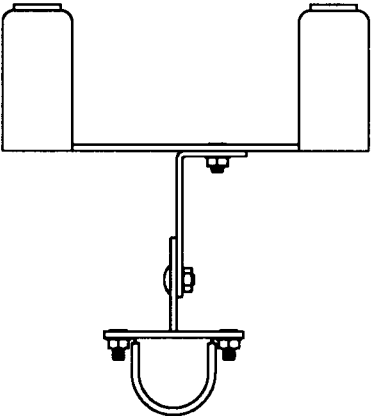
FIG. 3 is the left end view of FIG. 1.

The invention is fabricated from ⅛" thick mild steel. FIG. 1-7 depicts the invention without the adjoining trike axle cage, rear rack battery, accessories and basket. With reference to FIG. 1 the invention in its entirety is 101; above axle, universal bolt on rear rack type battery and accessory mounting base/basket riser for e-trike conversion. Further reference to this title will be stated as "mounting base/basket riser". 102 depicts the front portion of the mounting base/basket riser and 103 depicts the rear portion, both of which rest on the top of the axle cage tubes. The two axle cage tubes are ⅞" diameter and have two mounting holes each for the trike basket for a total of four holes. These mounting holes on the axle cage will be utilized to fasten the mounting base/basket riser through holes identified as 112 on FIG. 5 and slots 113, FIG. 5 to the trike axle cage with bolts, washers and nuts that are part of the tricycle fastener kit which are originally intended to mount the basket. The general positioning of the mounting base/basket riser is established by the alignment of the front holes 112 to the front axle cage holes. The universal mounting design of the mounting base/basket riser to an axle cage is by way of an axle cage mounting plate 105. The axle cages that were evaluated for design compatibility with this bracket are consistent in hole spacing lineally along individual tubes but vary from front tube to rear tube due to the welded position of these tubes radially around the axle tube.

Figure 5:
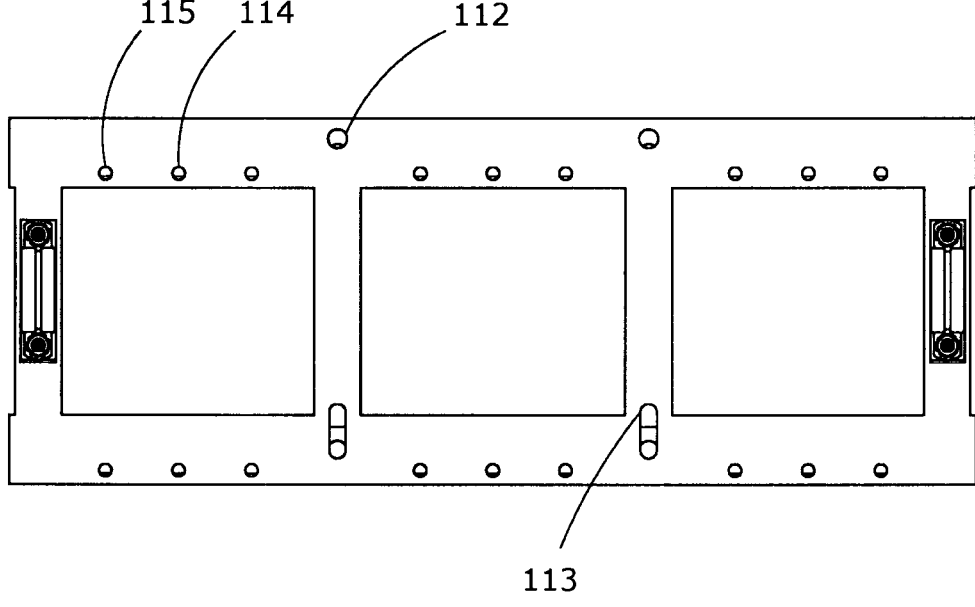
FIG. 5 is the bottom view of FIG. 1 with the back of the unit facing down
Figure 6:
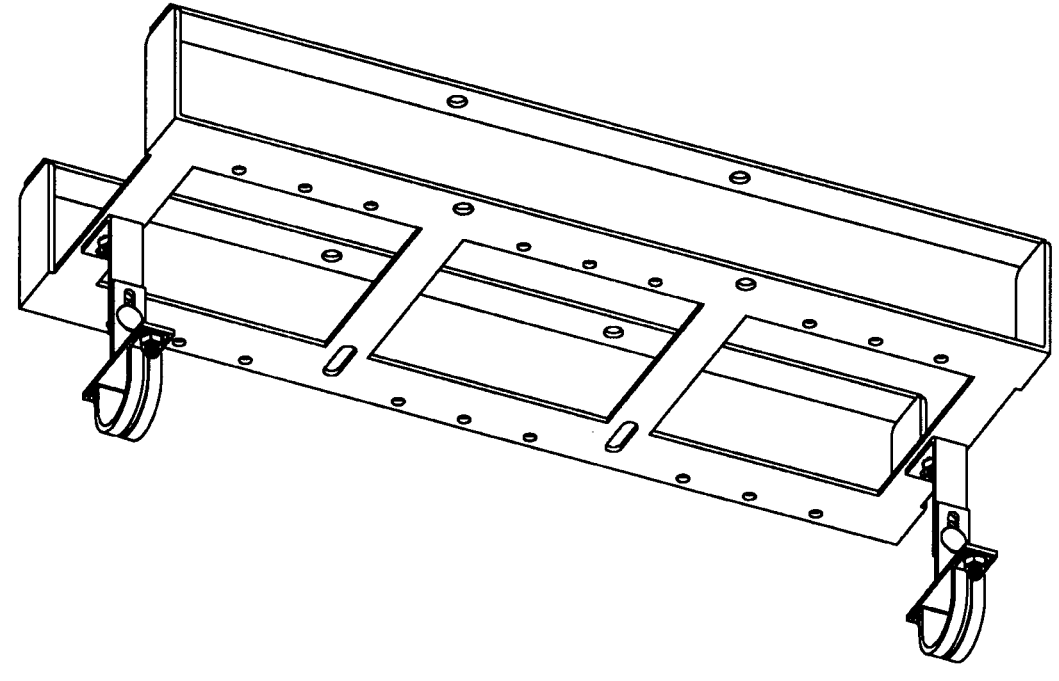
FIG. 6 is the front/bottom/left perspective view of FIG. 1
Figure 7:
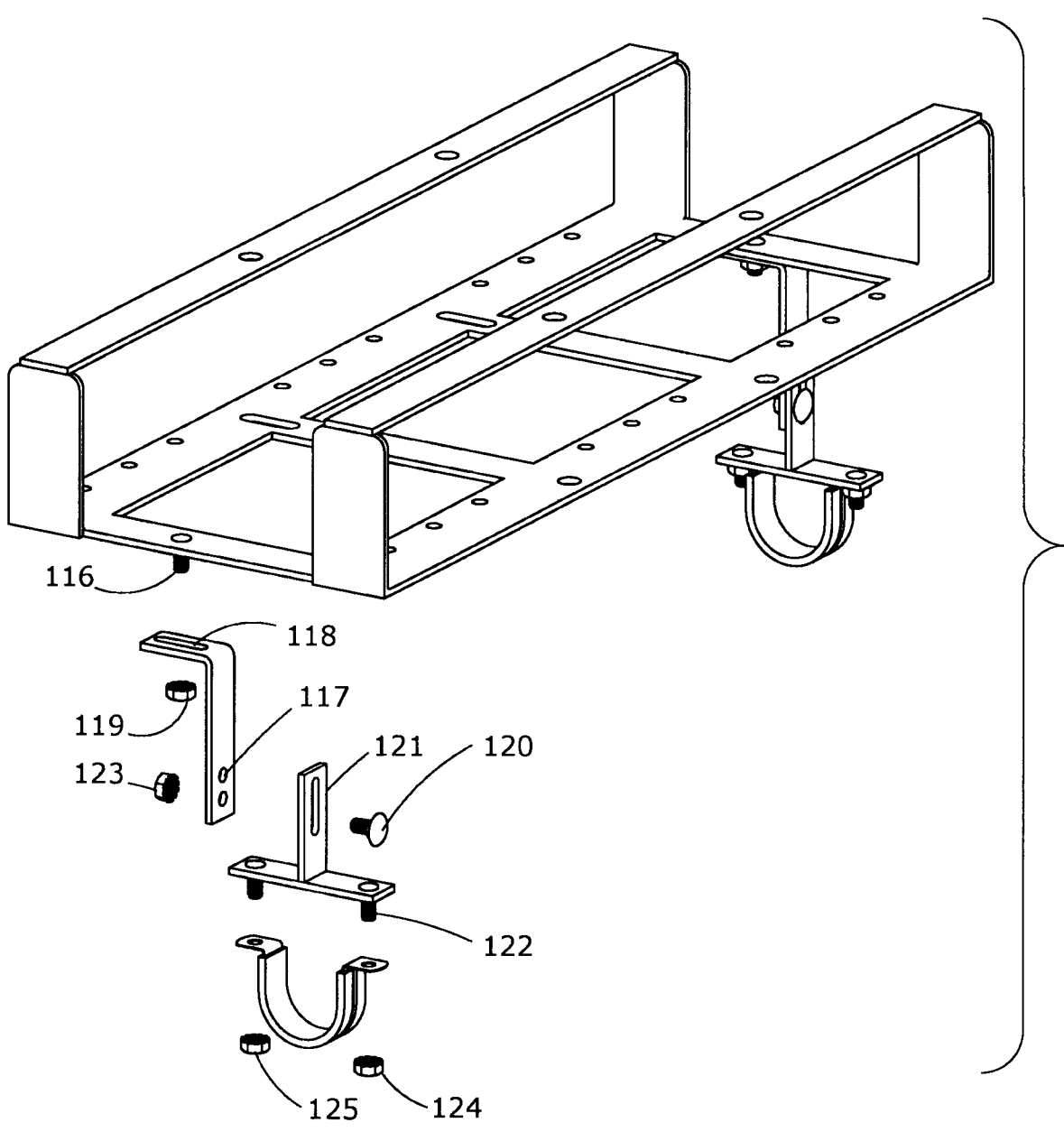
FIG. 7 is the front/top/left/perspective view an exploded view of the left clamp feature of FIG. 1
Figure 8:
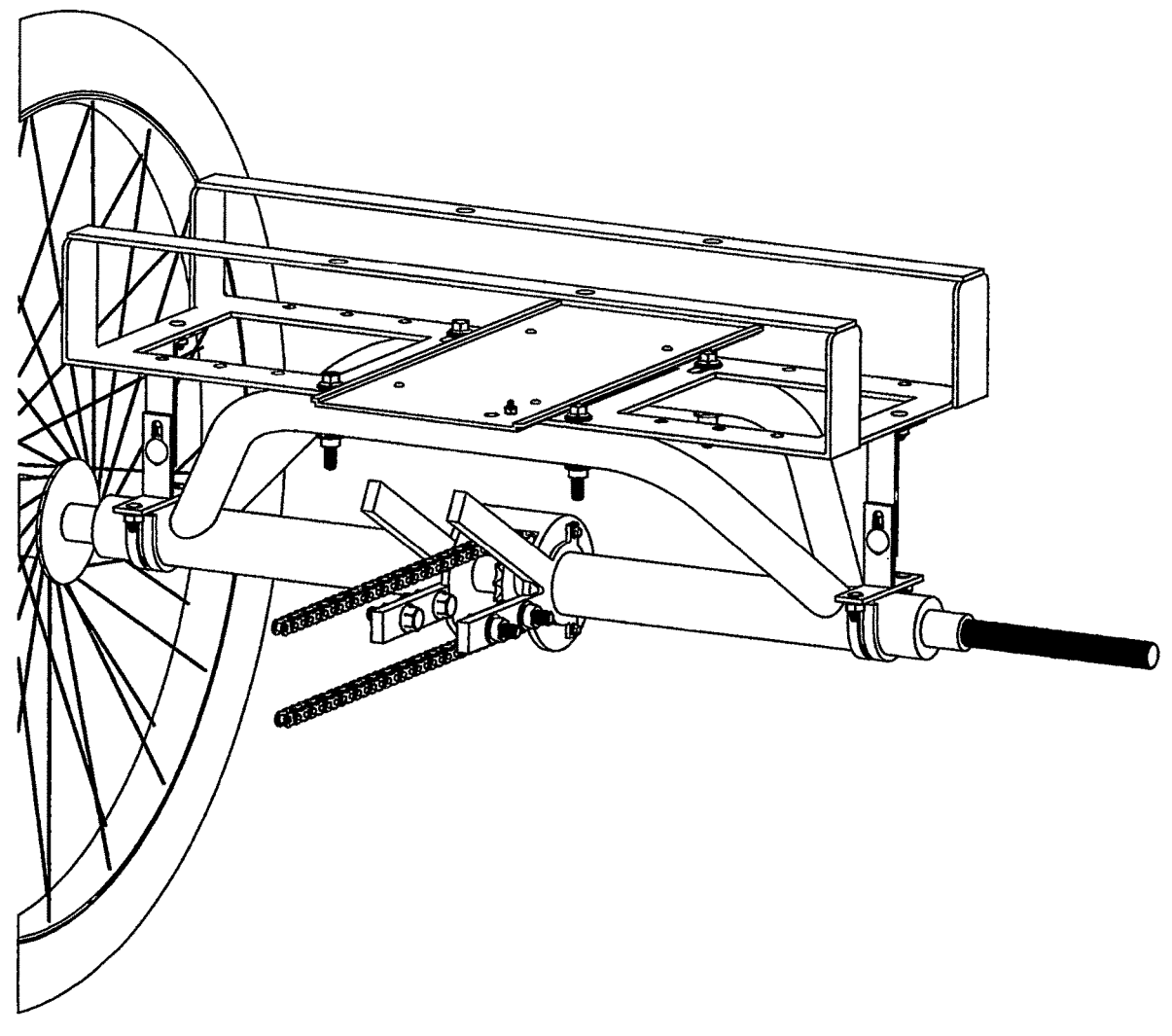
FIG. 8 shows the invention bolted to the trike axle cage, shows a mounted rear rack type battery mounting plate in the center position, and has the basket mounted.
Figure 9:
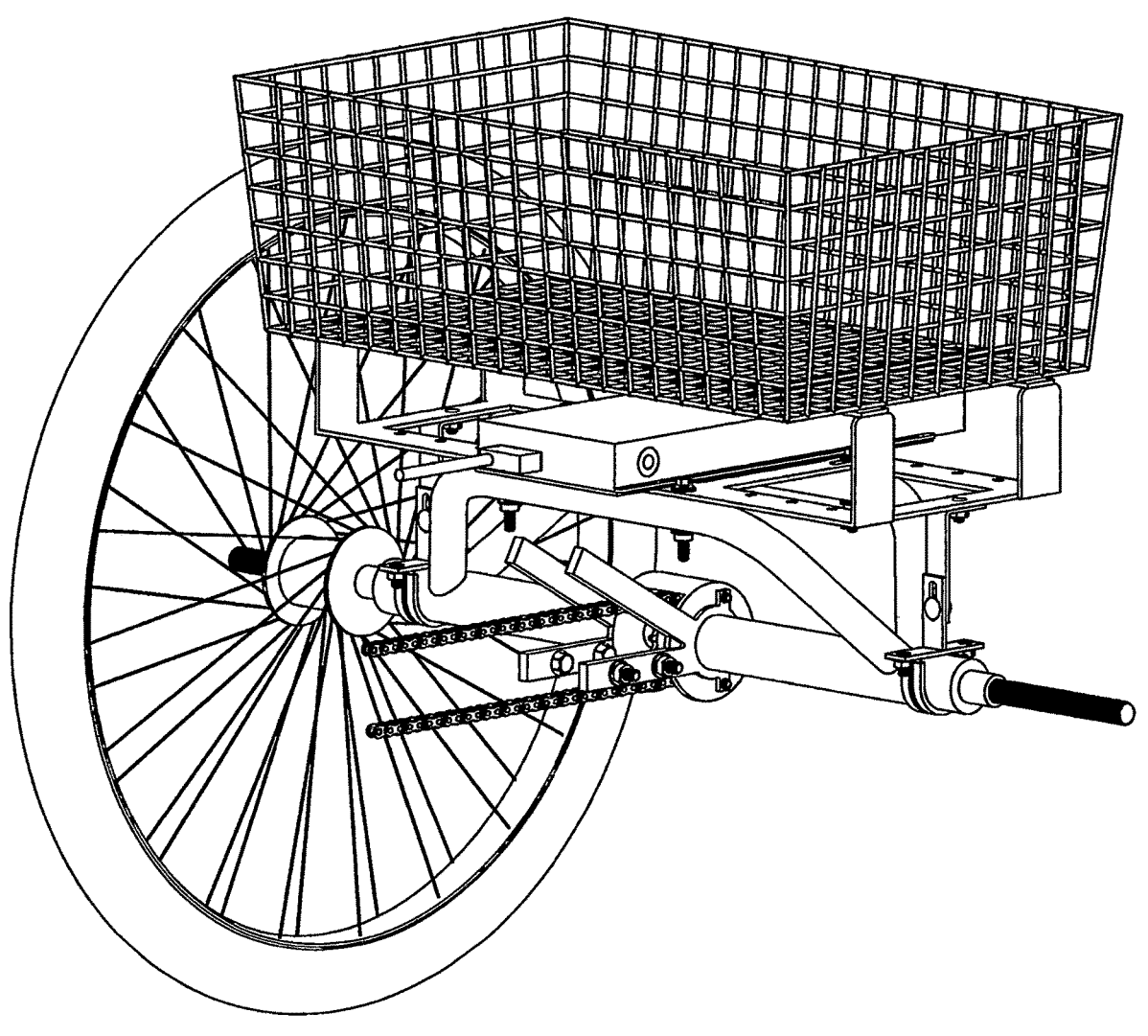
FIG. 9 shows the invention bolted to the trike axle cage, shows a mounted rear rack type battery mounting plate with the battery locked to it in the center position, and has the basket mounted.

With reference to FIG. 1 four plates are featured, two end plates 104 with studs 116, FIG. 7 and two 105 which feature part of the rear mounting slots 113, FIG. 5. The two end plates 104 transfer the battery weight load down to the axle tube through end supports which is especially critical when the two outer positions of the three are used to mount batteries. The studs 116 FIG. 7 are for mounting the slotted hole, 118 end of the "L" brackets 106. These slots allow for adjusting the vertical end of 106 to a position center line to the axle tube and are secured with locknuts 119, FIG. 7.

The distance from the underside of the mounting base/basket riser FIG. 1, 101 to the top of the tricycle rear axle tube varies. This universal fit design addresses this by offering a large range reach by way of adding two holes FIG. 7, 117 to the vertical portion of the "L" FIG. 1, 106. The mating part to this set of holes is FIG. 1, 107. This is a "T" bracket that rests on top of the axle tube of the trike axle cage. The vertical portion of this "T" has a slot FIG. 7, 121 that allows fastening by way of carriage bolts FIG. 7, 120 and lock nuts FIG. 7, 123. The best aligned bolt hole of the two FIG. 7, 117 is used based on the axle cage dimensions. The horizontal part of the "T" FIG. 1, 107 rests on the axle tube. Two threaded studs 122 FIG. 7 are featured on item 107 which allow standard rubber lined stainless steel "U" clamps 109, FIG. 1 to be utilized. Clamp 109 is fastened with locknuts FIGS. 7, 124 and 125.

FIG. 5, 115 illustrates the holes that align to the battery mounting plate found on the rear rack style battery. The mounting base/basket riser FIG. 1, 101 features 3 battery/ accessory mounting positions. Each of these battery positions has six holes. Four numbered 115 are to mount the battery plate that comes with the rear rack style battery. The pair of holes 114 in the center of each of the 3 battery/accessory mounting positions allows for mounting of accessory items such as a tool kit or an e-bike motor controller. The location of the holes, FIGS. 5, 114 and 115 on features 102 and 103 of FIG. 1, allows all fasteners used in these holes to clear the axle cage tubes. The clearance is provided by locating all of the holes 114 and 115 behind the parallel axle cage tubes.

Figure 4:
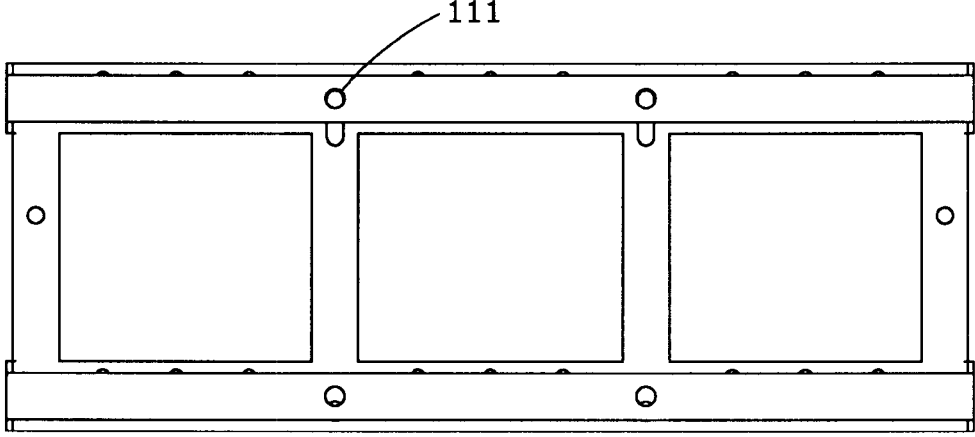
FIG. 4 is the top view of FIG. 1

Providing vertical clearance for the batteries and accessories is detailed on FIG. 1. Item 110 are four bent vertical risers that establish the overall width of the mounting base/basket riser 101 as well as establish the battery and accessory clearance height. These vertical risers 110 provide a foundation for the basket mounting plates FIG. 1, 108. The basket mounting plates establish the top of FIG. 1, 101; above axle, universal bolt on rear rack type battery and accessory mounting base/basket riser for e-trike conversion. Two holes FIG. 4, 111 are present on each basket mounting plate 108, thus providing the 4 basket mounting holes. The baskets that come with adult pedal tricycles have ample mesh and universal slotted plates to mount to the 4 holes.

What is claimed here is:

1. An above axle, universal bolt-on, rear rack type battery and accessory mounting base/basket riser conversion apparatus for an electric tricycle having existing apertures for mounting a rear basket, comprising:
    an axle cage mounting plate having a set of mounting slots and holes for bolting the plate onto an axle cage of the electric tricycle;
    a riser comprising battery and accessory mounting holes providing up to three side by side individual mounting positions for one or more batteries or one or more accessories;
    a pair of basket mounting plates, the pair of basket mounting plates each comprising apertures for receiving bolts to connect the rear basket to the riser, the pair of basket mounting plates being positioned above the axle cage mounting plate;
    one or more end plates with threaded studs for attaching an end support feature; and
    an L-bracket comprising a first leg and a second leg, the first leg of the L-bracket comprising an adjustment slot to facilitate horizontal centering the riser with respect to an axle tube of the tricycle, and the second leg of the L-bracket comprising first and second apertures to facilitate fastening the L-bracket to a T-bracket portion of the end support feature.

2. The conversion apparatus of claim 1, further comprising front round mounting apertures for maintaining a position of the riser relative to the axle cage.

3. The conversion apparatus of claim 1, further comprising rear slotted mounting apertures disposed within the riser to allow a range of mounting bolt spacing.

4. The conversion apparatus of claim 1, further comprising at least six mounting holes for accommodating the attachment of the at least three batteries, at least three accessories, or a combination thereof.

5. The conversion apparatus of claim 4, wherein four of the mounting holes are designated as battery plate mounting holes.

6. The conversion apparatus of claim 4, wherein two of the mounting holes are designated as accessory mounting holes.

7. The conversion apparatus of claim 1, further comprising four vertical risers collectively configured to allow a width of the riser to be selected from one of three different width options.

8. The conversion apparatus of claim 1, further comprising four vertical risers collectively configured to allow a height of the mounting base/basket riser to be selected for ample battery and accessory clearance.

9. The conversion apparatus of claim 1, wherein the riser comprises a pair of end plates, one of the end plates being disposed on a left side of the riser, and the other end plate being disposed on a right side of the riser, each of the end plates comprising threaded studs for attaching an end support feature.

10. An above axle, universal bolt-on, rear rack type battery and accessory mounting base/basket riser conversion apparatus for an electric tricycle having existing apertures for mounting a rear basket, comprising:
    an axle cage mounting plate having a set of mounting slots and holes for bolting the plate onto an axle cage of the electric tricycle using the existing apertures for mounting the rear basket;
    a riser comprising battery and accessory mounting holes providing up to three side by side individual mounting positions for one or more batteries or one or more accessories;
    a pair of basket mounting plates, the pair of basket mounting plates each comprising apertures for receiving bolts to connect the rear basket to the riser, the pair of basket mounting plates being positioned above the mounting holes;
    one or more end plates with threaded studs for attaching an end support feature;
    wherein the end support feature comprises a T-bracket having an elongate aperture for adjustability in vertical positioning.

11. An above axle, universal bolt-on, rear rack type battery and accessory mounting base/basket riser conversion apparatus for an electric tricycle having existing apertures for mounting a rear basket, comprising:
    an axle cage mounting plate having a set of mounting slots and holes for bolting the plate onto an axle cage of the electric tricycle using the existing apertures for mounting the rear basket;
    a riser comprising battery and accessory mounting holes providing up to three side by side individual mounting positions for one or more batteries or one or more accessories;
    a pair of basket mounting plates, the pair of basket mounting plates each comprising apertures for receiving bolts to connect the rear basket to the riser, the pair of basket mounting plates being positioned above the mounting holes;
    one or more end plates with threaded studs for attaching an end support feature;
    wherein the riser comprises a pair of end plates, one of the end plates being disposed on a left side of the riser, and the other end plate being disposed on a right side of the riser, each of the end plates comprising threaded studs for attaching an end support feature;
    wherein the end support feature comprises a T-bracket having an elongate aperture providing adjustability in vertical positioning;
    wherein the T-bracket further comprises at least two threaded studs configured for joining a U-clamp to the T-bracket; and wherein the U-clamp is configured to be secured to an axle tube of the tricycle.

* * * * *